Figure 1:
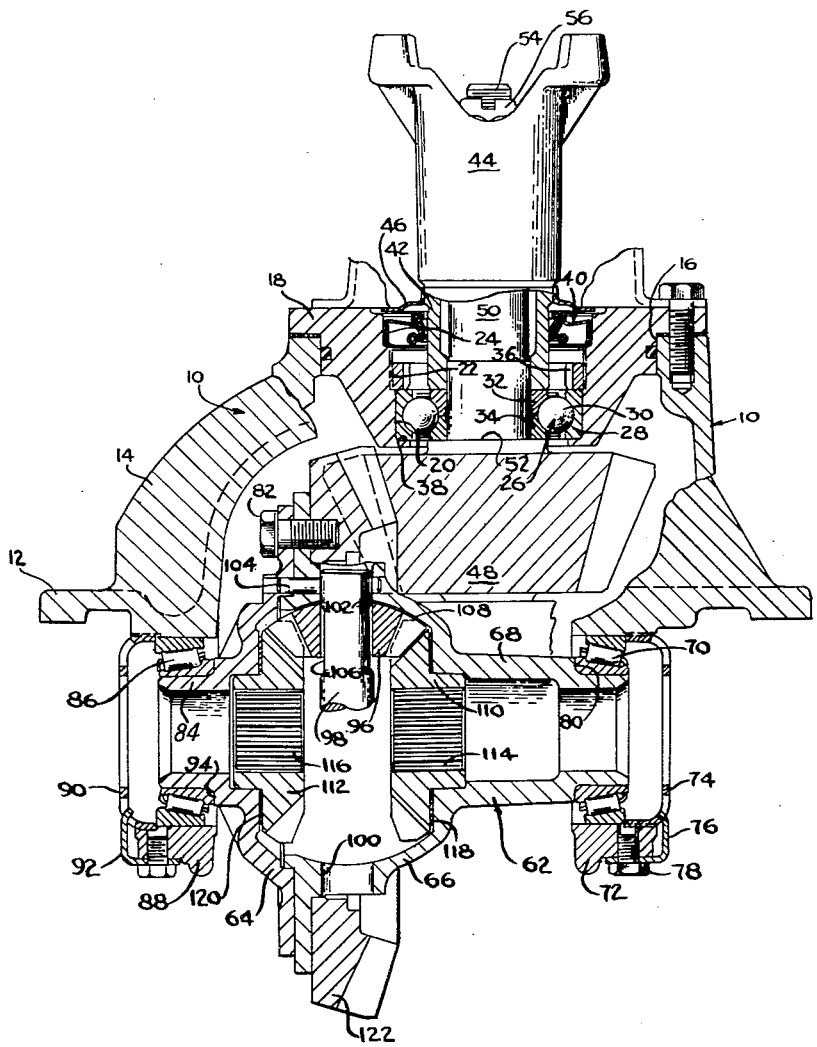

Oct. 31, 1961   R. E. HOFFMANN   3,006,700
PRELOADED BEARING STRUCTURE
Filed Aug. 7, 1959   2 Sheets-Sheet 1

Raymond E. Hoffmann
INVENTOR.

BY John G. Faulkner
& Donald J. Harrington
Attorneys

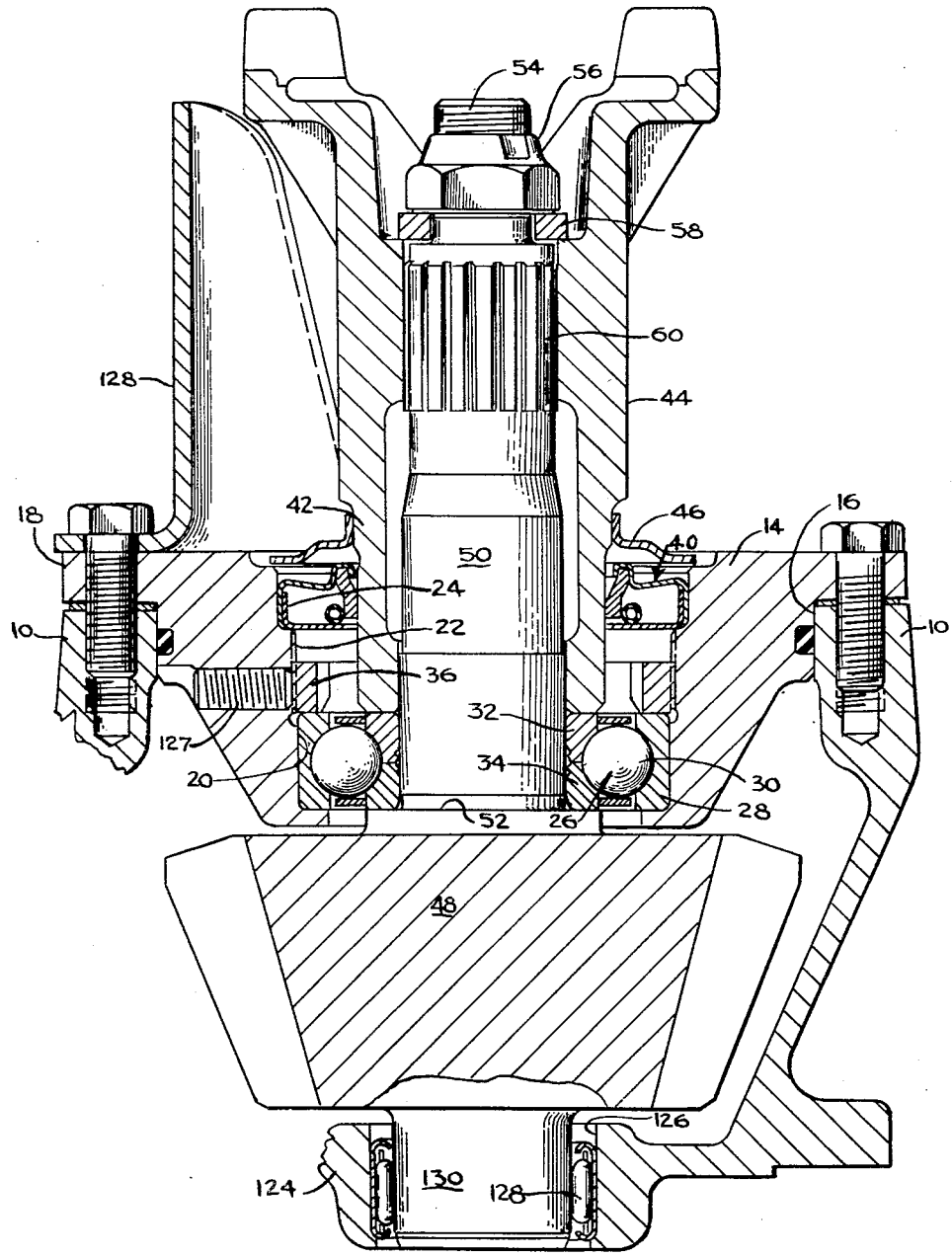

3,006,700
PRELOADED BEARING STRUCTURE
Raymond E. Hoffmann, Milford, Mich., assignor to Ford Motor Company, Dearborn, Mich., a corporation of Delaware
Filed Aug. 7, 1959, Ser. No. 832,244
5 Claims. (Cl. 308—178)

My invention relates generally to an improved bearing structure and more particularly to a mounting means for rotatably journaling a rotating member in which provision is made for eliminating free play of the rotating member.

My invention may be readily applied to a drive pinion mounting means for an automotive vehicle rear axle and differential assembly, although I contemplate that the principles of my invention may also be used in other environments including other automotive installations having driving or driven gears wherein axial movement of the gears must be limited to assure quiet, smooth operation.

According to a principal feature of my invention, I have made provision for preloading the bearing elements of my improved bearing structure, thereby eliminating relative free movement of the journaled member during operation. The manufacturing tolerances being compensated for in the assembly will not cause misalignment or shifting of the journaled member in spite of variations in direction and magnitude of the static and dynamic loads during operation. This characteristic is of special importance in drive assemblies for wheeled vehicles since such free movement of the drive pinion relative to the cooperating drive gear will cause excessive noise and accelerated wear.

The provision of an improved mounting means of the type above described being a principal object of my invention, it is another object of my invention to provide a driving means for a gear assembly in an automotive vehicle drive line in which the associated bearing elements are preloaded during assembly.

It is a further object of my invention to provide a mounting means for a rotary member wherein a minimum amount of space is required for accommodating the component bearing elements thereof.

It is a further object of my invention to provide a mounting means for a rotary member which includes a single ball bearing unit with a bipartite inner race and wherein load transmitting members are employed for applying an axial preload to the parts of the inner race to effect a desired degree of preloading on the bearing unit.

It is a further object of my invention to provide an automotive drive pinion gear mounting in which the drive pinion is straddled by a radial roller bearing and by a single ball bearing capable of sustaining combined thrust and radial loads.

It is a further object of my invention to provide a mounting means as set forth in the preceding objects wherein the assembly is of simplified construction and wherein simplified manufacturing steps may be employed during manufacture.

It is a further object of my invention to provide a mounting means for a driving or driven gear which is capable of restraining axial movement of the gear to assure quiet, smooth running performance.

As previously mentioned, the principles of my invention may be readily applied to a drive pinion and ring gear assembly for an automotive vehicle. Such assemblies comprise a carrier housing which rotatably journals a drive pinion, the latter being supported on an integral or separate shaft which is connected either directly or indirectly to the power source by some suitable coupling device. A differential case is also rotatably journaled within the aforementioned carrier housing about an axis which is transversely disposed with respect to the axis of the drive pinion. A drive gear is arranged to drivably engage the drive pinion. The carrier housing may be integral with or separable from the axle housing assembly which houses and provides a means for supporting the axle shafts and other details not pertinent to this invention. The axle shafts are drivably connected to separate differential side gears situated in juxtaposed relationship within the differential case. A pair of differential pinion gears is journaled within the differential case and each differential pinion gear engages both of the differential side gears, said differential pinion gears being rotatable about their own respective axes.

It is conventional practice to mount a drive pinion in one of the following ways. One mounting method comprises a straddle bearing arrangement wherein a pair of opposed tapered roller bearings are employed for journaling the drive pinion shaft on the outboard side of the drive pinion and wherein a pilot or straddle bearing is used for journaling the inboard side of the drive pinion to the supporting member of the carrier housing. A second way of journaling a drive pinion comprises an overhanging drive pinion arrangement wherein a pair of opposed tapered roller bearings are situated on the outboard side of the drive pinion and wherein the spacing between the bearings is relatively large in comparison to the aforementioned straddle mounting arrangement. This overhanging arrangement of necessity requires more space than the straddle mounting arrangement.

In each of the above-described bearing arrangements the tapered roller bearings are preloaded by utilizing a deformable sleeve which engages one race of the bearing and which is arranged so that a clamping force applied to the drive pinion shaft may be transferred to the carrier housing through the bearing and the deformable sleeve. The clamping force causes the sleeve to deform and the inherent resiliency of the sleeve results in a continuous preload on the bearing units. Another means of preloading the tapered roller drive pinion bearings comprises a solid, non-deforming spacer. This spacer is disposed so that it contacts both bearings or one bearing and a shoulder on the pinion shaft. The thickness (axial width between bearings or bearing and shoulder) is determined by measurement and appropriate selection of a spacer provides the proper continuous preload on the bearings.

The improved mounting arrangement of my instant invention employs a single ball bearing unit which is used in lieu of the aforementioned tapered roller bearings, and according to a preferred arrangement of my invention, a pilot or straddle bearing is situated on the inboard side of the drive pinion to provide a straddle bearing mounting. The single ball bearing unit in my improved construction occupies considerably less space than the dual roller bearing units used in a straddle arrangement of the type above described.

The single ball bearing unit in my improved construction is situated on the outboard side of the drive pinion and the inner race thereof is formed in two parts having a predetermined axial clearance therebetween when the bearing unit is in a disassembled condition. Provision is made for exerting an axial load on the inner race so that the individual parts thereof will be drawn together, thereby causing a radial preload on the bearing unit. This preload in turn eliminates the problem of free play in the drive pinion as previously discussed.

For the purpose of more particularly describing my invention, reference will be made to the accompanying drawings wherein:

FIGURE 1 is a partial assembly view showing in cross secion a differential gear assembly of the type used in automotive vehicles and which embodies my invention; and FIGURE 2 is an enlarged view of the differential drive pinion of FIGURE 1 showing in more particular detail the bearing mounting arrangement of my instant invention.

Referring now to the drawings, numeral 10 generally designates a differential carrier housing which is formed with a generally bell-shaped interior and with a peripheral flange 12. The exterior of the housing 10 is formed with ribs 14 for the purpose of increasing the strength and rigidity of the housing. The flange 12 is adapted to be bolted to an axle housing, not shown, which in turn encloses the axle shafts for the vehicle traction wheels and portions of the differential gear assembly. Suitable bolts may be used for bolting the flange 12 to the axle housing.

The carrier housing 10 is formed with an opening 16 within which is received a pinion retainer member 18. This retainer member 18 is formed with a central opening having spaced portions of different diameters, these spaced portions being separately identified by numerals 20, 22 and 24. A ball bearing unit generally identified by numeral 26 is received within portion 20 of the central opening of the retainer member 18 and it includes an outer race 28, a series of ball bearing elements 30 and a bipartite inner race, one inner race part being shown at 32 and another part being shown at 34. An externally threaded retainer nut 36 is threadably received in portion 22 of the opening in retainer member 18 and is adapted to maintain bearing race 28 in engagement with an annular shoulder 38 as indicated.

Portion 24 of the opening in retainer member 18 receives a fluid seal generally shown at 40 which forms a sliding fluid seal around a sleeve 42, the latter forming a part of a driving yoke identified by numeral 44. The vehicle drive shaft may be drivably coupled to yoke 44 in a conventional fashion by means of a universal joint connection. A shield 46 may be carried by sleeve 42 adjacent seal 40.

A drive pinion is shown at 48 and it comprises a pinion shaft 50 which extends through sleeve 42 and which is journaled within bearing unit 26, the bipartite inner race of the bearing unit 26 surrounding shaft 50. An annular shoulder 52 is formed around drive pinion shaft 50 and it engages the inner race part 34 of the bearing unit 26. The end of sleeve 42 engages the other part of bearing unit 26. The terminal part of shaft 50 is threaded as shown at 54 for the purpose of accommodating a clamping nut 56. The clamping nut 56 is adapted to apply a clamping force to yoke 44 and to sleeve 42 when it is threaded on shaft 50, and a suitable spacer or washer 58 is provided for transmitting the clamping effort to the sleeve 42.

Intermediate portions of the sleeve 42 and of the shaft 50 are splined as indicated at 60 for the purpose of providing a driving connection between shaft 50 and yoke 44 and the driving torque delivered to yoke 44 is transferred to drive pinion 48.

The differential case is generally identified in FIGURE 1 by numeral 62 and it is formed in two parts, one part being shown at 64 and the other part being shown at 66. However, I contemplate that the case may also be of single piece construction. The part 66 includes an extension 68 which is journaled for rotation by bearing unit 70. A bearing cap 72 is secured to carrier housing 10 for the purpose of retaining bearing unit 70 in place. The bearing cap 72 is adapted to threadably receive adjusting nut 74 which retains the outer race of the bearing unit assembly in place. A locking finger 76 is secured to the bearing cap 72 by a bolt 78 and is adapted to be received in any one of several openings formed in adjusting nut 74 for retaining the latter in any desired position. The adjusting nut 74 is adapted to apply a clamping force on bearing unit 70. The inner race of bearing unit 70 is retained against a shoulder 80 around extension 68 of the differential case part 66.

A drive gear, shown at 122, has a number of threaded holes which are placed in alignment with a similar number of holes in differential case part 66. Differential case part 64, having the same number of holes as part 66 and gear 122, is placed in position and bolts 82 pass through the holes in differential case parts 64 and 66 engaging the threaded holes in the drive gear 122. Part 64 includes an extension 84 which is journaled by means of a bearing unit 86, the latter being retained in place by a bearing cap 88 which is secured to carrier housing 10. The bearing cap 88 threadably receives an adjusting nut 90 which is adapted to apply a clamping force to the outer race of bearing unit 86, and it is held in place by a locking finger 92. The inner race of bearing unit 86 is retained against a shoulder 94 formed on the differential case part 64. Both the bearing units 86 and 70 include tapered roller elements capable of accommodating axial thrust loads as well as radial loads, and axial pressure applied by the respective adjusting nuts 90 and 74 prevent excessive free play. The differential case parts 64 and 66 define an interior chamber within which is disposed a pair of differential pinion gears, one of which is shown at 96. Gear 96 is journaled on a differential pinion shaft 98 which extends across the interior of the chamber defined by differential case parts 64 and 66 and which is received in openings 100 and 102. A retainer pin 104 is situated in aligned openings formed in differential case parts 64 and 66 and in pinion shaft 98. The shaft 98 is formed with flats 106 for the purpose of lubricating the pinion gear 96. A spherical thrust washer 108 is disposed between differential pinion gear 96 and the adjacent wall of the housing part 66.

A pair of differential side gears is shown at 110 and 112 and these gears are disposed in driving engagement with pinion gear 96. Another differential pinion gear is situated in juxtaposed relationship with respect to pinion gear 96 and is journaled on shaft 98, although it is not illustrated in the drawing. This other pinion gear is also situated in driving engagement with differential side gears 110 and 112. The gears 110 and 112 are formed with internally splined openings 114 and 116, respectively. One axle shaft extends through extension 68 of differential case part 66 and is positively splined to gear 110 and another axle shaft extends through extension 84 of differential case part 64 and is positively splined to side gear 112. The side gears 110 and 112 are provided with thrust washers 118 and 120, respectively.

The drive ring gear 122 is adapted to rotate with differential case 62 about its geometric axis and is situated in driving engagement with drive pinion 48.

Referring more particularly to FIGURE 2, I have shown at 124 a supporting wall portion of carrier housing 10 which is apertured at 126 to receive a pilot bearing 128. The pilot bearing 128 is adapted to rotatably journal an extended portion 130 on the inboard side of the drive pinion 48. Also shown in FIGURE 2 is a screw 127 for retaining the nut 36 in place after adjustment.

It is apparent from the foregoing description that the drive pinion 48 is mounted by means of a straddle bearing arrangement in which only a single bearing unit is situated on the outboard side of the pinion 48. This is in contrast with conventional practice wherein two tapered roller bearings are used, and the reduction of space accompanying the single ball bearing of my instant construction is substantial. The inner race parts 32 and 34 of the bearing unit 26 are normally formed with a clearance therebetween before a clamping torque is applied to the nut 56. After the bearing and the gear assembly have been assembled, a clamping torque is applied to the nut 56 and this in turn moves the inner race parts 32 and 34 together, thereby closing the clearance. In one operating embodiment of my invention the clamping force will cause the inner race parts 32 and 34 to become situated in engaged relationship and any further clamping torque applied to the clamping nut 56 will have no effect on the preloading of the bearing unit 26.

This clamping effort applied to the inner race parts 32 and 34 will result in a radial pressure on the ball bearing elements 30 and this same pressure will be maintained during continued operation of the unit.

For the purpose of analysis, the ball bearing elements 30 may be considered to have four point contact with the associated bearing races, two points of contact being at the contoured surfaces of the outer race and the other points of contact being located at desired points along the contoured surfaces of the inner race parts 32 and 34. The actual location of the effective line of action for the inner race parts may be varied, depending upon the bearing characteristics which are desired and upon the ratio of the thrust loads to the radial loads which are experienced during operation under any given conditions. The dynamic loads to which the bearing unit 26 is subjected during operation will be varied in direction, the direction of the effective force depending upon whether or not the engine is delivering torque to the rear wheels or whether the rear wheels are driving the engine during coasting operation. However, in either instance the bearing unit 26 will be capable of accommodating the associated thrust and radial loads.

Although I have illustrated one preferred embodiment of my invention, I anticipate that the principles disclosed herein may be applied with success in other bearing installations and environments and with automotive driving axles in which component parts vary widely from those incorporated in this description.

What I claim and desire to secure by United States Letters Patent is:

1. A bearing structure for rotatably mounting a rotary torque delivery member, mounting shaft extensions situated on either side of said rotary member, a separate bearing support disposed on each side of said rotary member, first bearing means for journaling one shaft extension in one of said bearing supports, a second bearing means for rotatably journaling the other shaft extension in the other bearing support, said second bearing means including a ball bearing unit having a two-part inner race, an outer race and a plurality of ball bearing elements disposed between said races, each inner race part being engageable with said bearing elements, said inner race parts normally having a predetermined clearance therebetween, and means for applying an axial force to said inner race parts which tends to urge the same to a relative position of zero clearance and to preload said bearing elements, said force applying means including a sleeve surrounding said other shaft extension and engageable with one of said inner race parts, the other inner race part being anchored to said other shaft extension.

2. A bearing structure for rotatably mounting a rotary torque delivery member, mounting shaft extensions situated on either side of said rotary member, a bearing support disposed on each side of said rotary member, first bearing means for journaling one shaft extension in one of said bearing supports, a second bearing means for rotatably journaling the other shaft extension in the other bearing support, said second bearing means including a ball bearing unit having a two-part inner race, an outer race and a plurality of ball bearing elements disposed between said races, each inner race part being engageable with said bearing elements, said inner race parts normally having a clearance therebetween, and means for applying an axial force to said inner race parts which tends to reduce said clearance to zero and to preload said bearing elements, said force applying means comprising a sleeve telescopically received over said other shaft extension.

3. In a gear assembly, a driving pinion having hub shaft extensions disposed on either side thereof, a separate bearing support disposed on either side of said pinion, first bearing means carried by one of said bearing supports for rotatably journaling one of said shaft extensions, second bearing means carried by the other bearing support for rotatably journaling the other shaft extension, said second bearing means comprising a ball bearing unit having a two-part inner race, an outer race and a plurality of ball bearing elements situated between said races, each inner race part being engageable with said bearing elements, said inner race parts being formed with a predetermined clearance therebetween when the bearing unit is disassembled, a power delivery sleeve telescopically received over and drivably connected to said other shaft extension, a shoulder formed on said other shaft extension, one inner race part being engageable with said shoulder and the other inner race part being engageable with said sleeve, and means for applying an axially directed clamping force to said sleeve and said other shaft extension to urge said inner race parts toward an engaging position whereby a preload is applied to said bearing unit.

4. In a gear assembly, a driving pinion having hub shaft extensions disposed on either side thereof, a bearing support disposed on either side of said pinion, first bearing means for rotatably journaling one of said shaft extensions, second bearing means carried by the other bearing support for rotatably journaling the other shaft extension, said second bearing means comprising a ball bearing unit having a two-part inner race, an outer race and a plurality of ball bearing elements situated between said races, each inner race part being engageable with said bearing elements, said inner race parts being formed with a predetermined clearance therebetween when the bearing unit is disassembled, a power delivery sleeve telescopically received over and drivably connected to said other shaft extension, a shoulder formed on said other shaft extension, one inner race part being engageable with said shoulder and the other inner race part being engageable with said sleeve, said other shaft extension having an externally threaded portion and said sleeve having an internal annular shoulder, a thrust washer engageable with said shoulder and disposed about said threaded portion, and a clamping nut threaded on said threaded portion and engageable with said thrust washer, said inner race parts being urged together to reduce said clearance to zero when said clamping nut is tightened against said thrust washer.

5. In a gear assembly, a drive pinion having hub shaft extensions disposed on either side thereof, a bearing support disposed on either side of said pinion, first bearing means for rotatably journaling one of said shaft extensions, second bearing means carried by the other bearing support for rotatably journaling the other shaft extension, said second bearing means comprising a ball bearing unit having a two-part inner race, an outer race and a plurality of ball bearing elements situated between said races, each inner race part being engageable with said bearing elements, said inner race parts being formed with a predetermined clearance therebetween when the bearing unit is disassembled, a power delivery sleeve telescopically received over and drivably connected to said other shaft extension, a shoulder formed on said other shaft extension, one inner race part being engageable with said shoulder and the other inner race part being engageable with said sleeve, and means for applying an axially directed clamping force to said sleeve and said other shaft extension to urge said inner race parts together whereby a preload is applied to said bearing unit, said inner race parts being engageable when a limiting clamping force is applied thereto, the degree of preloading of said bearing unit assuming a predetermined limiting value when the clearance between said inner race parts is zero.

References Cited in the file of this patent

UNITED STATES PATENTS

| | | |
|---|---|---|
| 373,850 | Pope | Nov. 29, 1887 |
| 874,811 | Weidely | Dec. 24, 1907 |
| 1,210,516 | Morris | Jan. 2, 1917 |
| 1,279,574 | Morris | Sept. 24, 1918 |
| 1,285,017 | Brush | Nov. 19, 1918 |
| 1,337,411 | Richard | Apr. 20, 1920 |
| 1,761,922 | Hutchinson | June 3, 1930 |
| 2,142,575 | Spicacci | Jan. 3, 1939 |
| 2,174,261 | Griswold | Sept. 26, 1939 |
| 2,219,025 | Vanderberg | Oct. 22, 1940 |

FOREIGN PATENTS

| | | |
|---|---|---|
| 122,551 | Great Britain | Jan. 30, 1919 |